(12) United States Patent
Park et al.

(10) Patent No.: US 12,411,970 B2
(45) Date of Patent: Sep. 9, 2025

(54) ELECTRONIC APPARATUS AND METHOD FOR VERIFYING ENCRYPTED DATA

(71) Applicant: SEOUL NATIONAL UNIVERSITY R&DB FOUNDATION, Seoul (KR)

(72) Inventors: Jai Hyun Park, Seoul (KR); Jung Hee Cheon, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 214 days.

(21) Appl. No.: 18/303,817

(22) Filed: Apr. 20, 2023

(65) Prior Publication Data

US 2024/0176904 A1 May 30, 2024

(30) Foreign Application Priority Data

Nov. 30, 2022 (KR) .................. 10-2022-0165042

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01)

(58) Field of Classification Search
CPC .................... G06F 21/602; G06F 21/6218
See application file for complete search history.

(56) References Cited

U.S. PATENT DOCUMENTS

| | | | |
|---|---|---|---|
| 11,139,971 B2 * | 10/2021 | Poeppelmann | H04L 9/004 |
| 11,791,998 B1 * | 10/2023 | Jung | H04L 9/3255 |
| | | | 713/171 |
| 11,991,274 B2 * | 5/2024 | Garcia Morchon | H04L 9/3093 |
| 2008/0069344 A1 * | 3/2008 | Yao | H04L 9/0844 |
| | | | 713/171 |
| 2015/0229478 A1 * | 8/2015 | Hoffstein | H04L 9/3236 |
| | | | 713/176 |
| 2018/0212750 A1 * | 7/2018 | Hoffstein | G06F 17/16 |

(Continued)

FOREIGN PATENT DOCUMENTS

KR 20210128303 A 10/2021

OTHER PUBLICATIONS

Park, Jai Hyun et al. "Efficient verifiable computation over quotient polynomial rings", published online: Apr. 21, 2022, https://link.springer.com/article/10.1007/s10207-022-00590-x. 19 pages.

(Continued)

*Primary Examiner* — Gary S Gracia
(74) *Attorney, Agent, or Firm* — Steinfl + Bruno LLP (57) ABSTRACT

Provided are an electronic apparatus and a method for verifying encrypted data. The verification method of the electronic apparatus includes transmitting encrypted quotient polynomial rings to an external device, receiving, from the external device, a result value calculated through an operation process for at least one layer on the basis of the transmitted encrypted polynomial rings, transmitting a random value to the external device, and receiving claim data obtained by performing the operation process in a reverse order on the basis of the random value from the external device, and verifying the received result value on the basis of a value of the quotient polynomial rings corresponding to the random value and the received claim data.

15 Claims, 7 Drawing Sheets

(56) References Cited

U.S. PATENT DOCUMENTS

| | | | |
|---|---|---|---|
| 2018/0375640 A1* | 12/2018 | Laine | H04L 9/008 |
| 2020/0313886 A1* | 10/2020 | Poeppelmann | H04L 9/3236 |
| 2020/0366467 A1* | 11/2020 | Kim | H04L 9/085 |
| 2021/0119766 A1* | 4/2021 | Suresh | G06F 7/552 |
| 2021/0126768 A1* | 4/2021 | Kim | G06N 20/00 |
| 2021/0194680 A1* | 6/2021 | Lee | H04L 9/3093 |
| 2022/0029824 A1* | 1/2022 | Poeppelmann | H04L 9/0894 |
| 2022/0150064 A1* | 5/2022 | Akiyama | G09C 1/00 |
| 2022/0229634 A1* | 7/2022 | Hein | H04L 9/3093 |
| 2022/0231831 A1* | 7/2022 | Schneider | H04L 9/085 |
| 2022/0337389 A1* | 10/2022 | Gourjon | H04L 9/002 |
| 2022/0337398 A1* | 10/2022 | Schneider | H04L 9/085 |
| 2022/0385449 A1* | 12/2022 | Brochonski | G06N 20/00 |
| 2023/0037491 A1* | 2/2023 | Poeppelmann | H04L 9/003 |
| 2023/0125560 A1* | 4/2023 | Lablans | H03M 7/00 380/28 |
| 2023/0171103 A1* | 6/2023 | Poeppelmann | H04L 9/3093 380/30 |
| 2024/0022395 A1* | 1/2024 | Hoshizuki | G06F 21/60 |
| 2024/0176904 A1* | 5/2024 | Park | G06F 21/602 |

OTHER PUBLICATIONS

Bois, Alexandre et al., "Flexible and Efficient Verifiable Computation on Encrypted Data" Public-Key Cryptography—PKC 2021 (pp. 528-558). Springer. https://doi.org/10.1007/978-3-030-75248-4_19.

Chen, Shuo et al., "Verifiable Computing for Approximate Computation" Cryptology ePrint Archive, Paper 2019/762. https://eprint.iacr.org/2019/762. 17 pages.

Fiore, Dario et al., "Boosting Verifiable Computation on Encrypted Data" 23rd IACR International Conference. Public-Key Cryptography—PKC 2020. 30 pages.

Notice of Allowance issued for Korean Patent Application No. 10-2022-0165042 filed on Nov. 30, 2022 on behalf of Seoul National University R&DB Foundation. Issuance date: Jun. 13, 2025. 7 pages (original with English translation).

* cited by examiner

ELECTRONIC APPARATUS AND METHOD FOR VERIFYING ENCRYPTED DATA

BACKGROUND

Field

Apparatuses and methods consistent with the disclosure relate to an electronic apparatus and a method for verifying encrypted data.

Description of the Related Art

With the development of electronic technology and communication technology, a method of processing data using an external device such as a cloud computer has been widely used. When data is processed using an external device, the confidentiality of data and the accuracy of an operation may be critical. The confidentiality of the data may be associated with the protection of a client's personal information, and the accuracy of an operation may be associated with a processing result of the data.

The above-described problem may be solved by data encryption and an operation verification method. However, there is a problem with applying data encryption and the operation verification method in terms of overhead and efficiency. In particular, there is a need for a new method of efficiently verifying quotient polynomial rings.

SUMMARY

To address the above-described problems, the disclosure is directed to providing an electronic apparatus and a verification method for efficiently verifying a result of performing an operation on encrypted data by using an external device.

According to an embodiment of the disclosure, a verification method of an electronic apparatus includes transmitting encrypted quotient polynomial rings to an external device, receiving, from the external device, a result value calculated through an operation process for at least one layer on the basis of the transmitted encrypted polynomial rings, transmitting a random value to the external device, and receiving claim data obtained by performing the operation process in a reverse order on the basis of the random value from the external device, and verifying the received result value on the basis of a value of the quotient polynomial rings corresponding to the random value and the received claim data.

The verification method may further include transmitting coefficient information of the quotient polynomial rings to the external device, and the receiving of the claim data may include receiving claim data obtained by performing the operation process in the reverse order on the basis of the coefficient information.

The verification method may further include receiving operation-related information and operation data of each of the at least one layer, and verifying the operation data of each of the at least one layer on the basis of the received operation-related information.

The receiving of the operation-related information and the operation data and the verifying of the operation data may include sequentially receiving the operation-related information and the operation data and verifying the operation data in the order from an initial layer to a last layer among the at least one layer.

The operation-related information may include at least one of arithmetic expression information or coefficient information.

When the operation-related information is the arithmetic expression information, the verifying of the operation data may include performing a modular arithmetic on the arithmetic expression information, and verifying the operation data on the basis of a relationship between the arithmetic expression information on which the modular arithmetic is performed and the received operation data.

Each of the quotient polynomial rings may be a polynomial for performing a modular arithmetic on a general polynomial ring.

According to another embodiment of the disclosure, an electronic apparatus includes a communication interface; and a processor, in which the processor is configured to control the communication interface to transmit encrypted quotient polynomial rings to an external device, receive from the external device a result value calculated by performing an operation process for at least one layer on the basis of the encrypted quotient polynomial rings, transmit a random value to the external device, and receive claim data obtained by performing the operation process in a reverse order on the basis of the random value from the external device, and verify the received result value on the basis of a value of the quotient polynomial rings corresponding to the random value and the received claim data.

The processor may be further configured to control the communication interface to transmit coefficient information of the quotient polynomial rings to the external device and receive claim data obtained by performing the operation process in the reverse order on the basis of the coefficient information.

The processor may be further configured to control the communication interface to receive operation-related information and operation data for each of the at least one layer, and verify the operation data of each of the at least one layer on the basis of the received operation-related information.

The processor may be further configured to sequentially receive and verify the operation-related information and the operation data in the order from a last layer to an initial layer among the at least one layer.

The operation-related information may include at least one of arithmetic expression information or coefficient information.

When the operation-related information is the arithmetic expression information, the processor may be further configured to perform a modular arithmetic on the arithmetic expression information and verify the operation data on the basis of a relationship between the arithmetic expression information on which the modular arithmetic is performed and the received operation data.

Meanwhile, each of the quotient polynomial rings may be a polynomial for performing a modular arithmetic on a general polynomial ring.

According to another embodiment of the disclosure, there is provided a non-transitory computer-readable storage medium storing a program for performing a verification method of an electronic apparatus, in which the verification method includes transmitting encrypted quotient polynomial rings to an external device, receiving, from the external device, a result value calculated through an operation process for at least one layer on the basis of the transmitted encrypted quotient polynomial rings, transmitting a random value to the external device and receiving claim data obtained by performing the operation process in a reverse order on the basis of the random value from the external device, and verifying the received result value on the basis of a value of the quotient polynomial rings corresponding to the random value and the received claim data.

According to various embodiments of the disclosure as described above, with an electronic apparatus and a verification method, encrypted data can be transmitted to an external device, and a result of an operation performed by the external device on the basis of the encrypted data can be verified efficiently.

Effects of the disclosure are not limited thereto, and other effects that are not described herein will be apparent to those of ordinary skill in the art from the following description.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Hereinafter, various embodiments will be described in more detail with reference to the accompanying drawings. Embodiments set forth herein may be variously modified. Certain embodiments are illustrated in the drawings and may be described in detail in the detailed description. However, the embodiments illustrated in the accompanying drawings are only intended to help understanding of various embodiments. Therefore, the technical scope of the disclosure is not limited by the embodiments illustrated in the accompanying drawings and should be understood to include all equivalents or alternatives within the spirit and scope of the disclosure.

Terms, including ordinal numbers such as first and second, may be used to describe various components but these components are not limited by the terms. The terms are only used to distinguish one component from another.

It should be understood that the terms "comprise" and/or "comprising", when used herein, specify the presence of stated features, integers, steps, operations, elements, components, or a combination thereof, but do not preclude the presence or addition of one or more features, integers, steps, operations, elements, components, or a combination thereof. When a component is referred to as being "coupled to" or "connected" to another component, it should be understood that the component may be directly coupled to or connected to the other component but another component may be interposed therebetween. In contrast, when a component is referred to as being "directly coupled to" or "directly connected" to another component, it should be understood that no component is interposed therebetween.

Meanwhile, the term "module" or "unit", when used herein to describe components, should be understood as performing at least one function or operation. In addition, the "module" or "unit" may perform a function or operation by hardware, software, or a combination of hardware and software. A plurality of "modules" or a plurality of "units" may be integrated into at least one module, excluding "modules" or "units" that should be performed by certain hardware or at least one processor. As used herein, the singular expressions are intended to include plural forms as well, unless the context clearly dictates otherwise.

In the following description of the disclosure, an order of operations should be understood unrestrictedly unless a preceding operation should be performed logically and temporarily prior to a subsequent operation. That is, except such an exceptional case, the essence of the disclosure will not be changed even when an operation described as a subsequent operation is performed prior to an operation described as a preceding operation, and the scope of the disclosure should be defined regardless of the order of operations. As used herein, the expression "A or B" should be defined not only as selectively referring to either A or B but also including both A and B. The term "include" as used herein should be understood as additionally including other components in addition to listed components.

In the present specification, only essential components required to describe the disclosure are described and components that are not related to the essence of the disclosure are not described. In addition, the term "include" should not be interpreted as an exclusive meaning including only components described herein, but should be interpreted as a non-exclusive meaning including other components.

In the following description of the disclosure, related well-known functions or components are briefly described or not described when it is determined that they would obscure the subject matter of the disclosure due to unnecessary detail. Meanwhile, embodiments may be independently implemented or operated but may be implemented or operated in combination.

Figure 1:
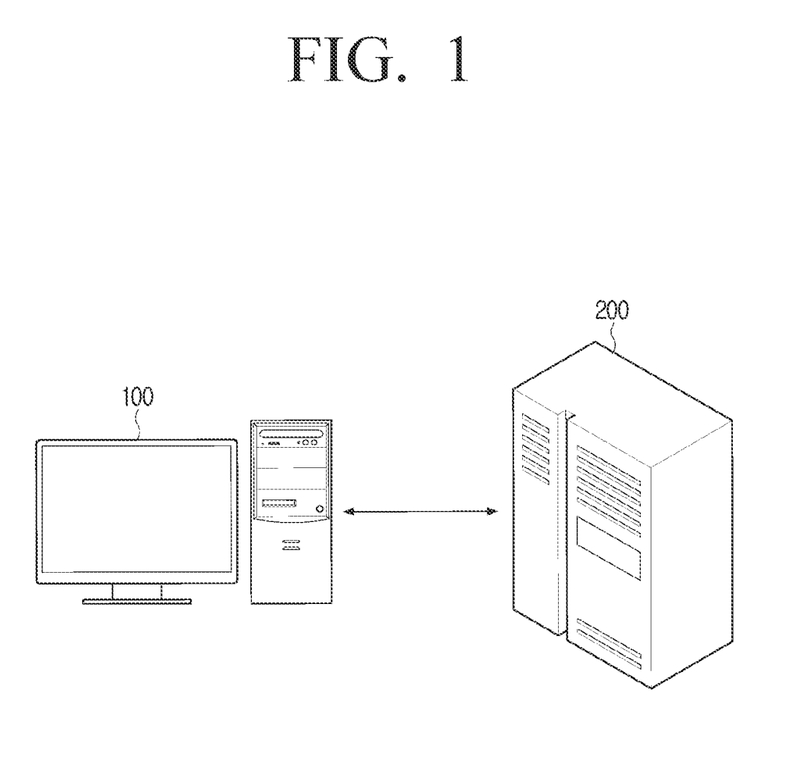
FIG. 1 is a diagram illustrating a verification system according to an embodiment of the disclosure.

FIG. 1 is a diagram illustrating a verification system according to an embodiment of the disclosure.

Referring to FIG. 1, the verification system may include an electronic apparatus 100 and an external device 200. Examples of the electronic apparatus 100 may include a smart phone, a laptop computer, a desktop computer, a navigation system, a tablet PC, a TV, and the like. The external device 200 may include a server, a cloud device, or the like.

The electronic apparatus 100 may transmit encrypted data to the external device 200. For example, the encrypted data may be data encrypted by homomorphic encryption (HE) or encrypted quotient polynomial rings (e.g., $\mathbb{Z}_Q[t]/(\phi(t))$). The quotient polynomial rings may be each a polynomial for performing a modular arithmetic on a general polynomial ring. The HE may include quotient polynomial rings with many additions or multiplications. The electronic device 100 may transmit the encrypted quotient polynomial rings to an external device. In the disclosure, $\mathbb{Z}$, $\mathbb{Z}_Q$ and $\mathbb{F}$ may denote an integer ring, ring of integers modulo a positive integer Q, and a finite field, respectively. In the disclosure, the base number of a log may be 2 unless otherwise indicated.

The external device 200 may perform an operation according to a layer on the basis of quotient polynomial rings received from the electronic apparatus 100, and calculate a result value of the operation. For example, the external device 200 may perform an operation on quotient polynomial rings using a layer arithmetic circuit where an input value is 2. The external device 200 may transmit the calculated result value of the operation to the electronic apparatus 100.

The electronic apparatus 100 may verify the result value of the operation received from the external device 200. For example, the electronic apparatus 100 may verify the result value of the operation using an interactive proof protocol with the external device 200. In an embodiment, the interactive proof protocol may include a Goldwasser, Kalai, and Rothblum's (GKR) protocol.

As described above, in quotient polynomial rings $\mathbb{Z}_Q[t]/(\phi(t))$ encrypted with homomorphic encryption (HE), $\phi(t)$ may be $2^{12}$ or more. A general verifiable computation (VC) system may verify an operation in a finite field. Accordingly, in order to verify an operation performed on quotient polynomial rings that are not finite fields by the electronic apparatus 100, more verbose computations should be performed in a finite field and thus significant overhead may occur in a verification process.

Thus, the electronic apparatus 100 of the disclosure may verify the result value of the operation using a one-point reduction method to increase the efficiency of the verification process. That is, the electronic apparatus 100 may transmit a random value related to the quotient polynomial rings to the external device 200. The external device 200 may perform an operation process in a reverse order on the basis of the random value received from the electronic apparatus 100. The external device 200 may calculate a result value of the operation through the operation process with multiple layers. Claim data may be data obtained by performing the operation in the order from a last layer to an initial layer in an operation process through which the result value of the operation is calculated. The external device 200 may calculate claim data through an operation process in the reverse order to the order of a process of calculating the result value of the operation. The claim data may be data related to an initial quotient polynomial ring transmitted from the electronic apparatus 100 to the external device 200.

For example, the claim data may be a value obtained by substituting a random value into the quotient polynomial rings received from the electronic apparatus 100. The external device 200 may transmit the claim data to the electronic apparatus 100. That is, the electronic apparatus 100 may obtain an operation result obtained by substituting the random value into the quotient polynomial rings transmitted to the external device 200. Thereafter, the electronic apparatus 100 may compare the obtained operation result with the received claim data to determine whether the operation result and the claim data are the same. The electronic apparatus 100 may determine that the received result value is true when the operation result and the claim data are the same, and determine that the received result value is false when the operation result and the claim data are not the same.

Alternatively, the electronic apparatus 100 may commit data with the external device 200 and verify the result value. For example, the electronic apparatus 100 may transmit coefficient information of the quotient polynomial rings to the external device 200 to commit the coefficient information with the external device 200. The external device 200 may calculate claim data by performing the operation process in the reverse order on the basis of the committed coefficient information. In an embodiment, the external device 200 may calculate claim data by performing a modular arithmetic mod $\phi(t)$ on the committed coefficient information. In addition, the external device 200 may transmit the calculated claim data to the electronic apparatus 100. The electronic apparatus 100 may determine whether the claim data is true by comparing an operation value obtained by performing the modular arithmetic on the quotient polynomial rings with the claim data obtained by performing the modular arithmetic and received from the external device 200. The modular arithmetic is an operation of dividing a polynomial ring by an N-order expression to reduce a degree of the polynomial ring. Accordingly, the electronic apparatus 100 may shorten a verification time by verifying the claim data of the polynomial ring on which the modular arithmetic is performed.

Alternatively, the electronic apparatus 100 may commit operation-related information and operation data of an operation performed on each of a plurality of layers by the external device 200. The external device 200 may sequentially perform the operation, starting from the last layer among the plurality of layers. The external device 200 may transmit the operation-related information and the operation data to the electronic apparatus 100. The electronic apparatus 100 may receive the operation-related information and the operation data from the external device 200, and verify the operation data on the basis of the received operation-related information. When the operation data is true, the electronic apparatus 100 may commit the operation-related information and the operation data with the external device 200. When operation-related information and operation data for one layer are committed with the electronic apparatus 100, the external device 200 may perform a subsequent operation process. For example, the initial layer may be a first layer, and the last layer may be an $n^{th}$ layer. When the external device 200 commits operation-related information and operation data for the $n^{th}$ layer with the electronic apparatus 100, the external device 200 may commit operation-related information and operation data for an $(n-1)^{th}$ layer with the electronic apparatus 100. When the electronic apparatus 100 determines that the operation-related information and the operation data for the first layer are true by repeatedly performing the process described above, a result value calculated by the external device 200 may be verified as true.

That is, the electronic apparatus 100 may receive operation-related information and operation data for each of at least one layer from the external device 200. In addition, the electronic apparatus 100 may verify the operation data of each of the at least one layer on the basis of the received operation-related information. In an embodiment, the operation-related information may include arithmetic expression information, coefficient information, and the like. When the operation-related information is arithmetic expression information, the external device 200 may transmit operation data obtained by performing the modular arithmetic to the electronic apparatus 100. The electronic apparatus 100 may perform the modular arithmetic on the basis of the received information about the arithmetic expression, and verify (or commit) the operation data on the basis of the relationship between the operation data obtained by performing the modular arithmetic and the operation data received from the external device 200.

Figure 2:
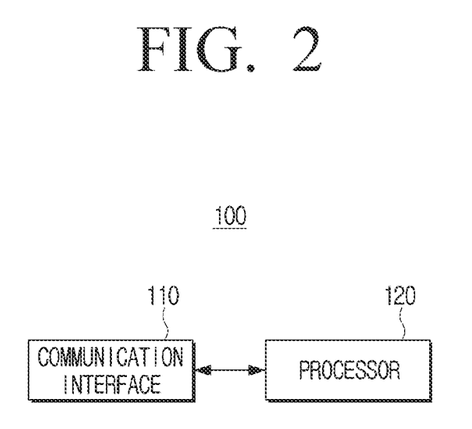
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, an electronic apparatus 100 may include a communication interface 110 and a processor 120.

The communication interface 110 may communicate with the external device 200. The communication interface 110 may transmit encrypted quotient polynomial rings to the external device 200 and receive a result value of an operation from the external device 200. The communication interface 110 may also receive claim data for verifying the result value of the operation from the external device 200. Alternatively, the communication interface 110 may transmit coefficient information of quotient polynomial rings and a random value to the external device 200, and receive operation data and operation-related information for each layer from the external device 200. For example, the communication interface 110 may communicate with the external device 200 by least one communication method among Wi-Fi, Wi-Fi direct, Bluetooth, Zigbee, 3rd Generation (3G), 3rd Generation Partnership Project (3GPP), and Long-Term Evolution (LTE). The communication interface 110 may be referred to as a communication device, a communicator, a communication module, a transceiver, or the like.

The processor 120 may control components of the electronic apparatus 100. For example, the processor 120 may control the communication interface 110 to transmit data to and receive data from the external device 200.

The processor 120 may verify a result value of an operation received from the external device 200. The processor 120 may transmit encrypted quotient polynomial rings to the external device 200 and receive a result value obtained by performing the operation on at least one layer on the basis of the transmitted encrypted quotient polynomial rings through the communication interface 110. In addition, the processor 120 may transmit a random value to the external device 200 and receive claim data, which is obtained by the external device 200 by performing an operation process in a reverse order on the basis of the random value, through the communication interface 110. The processor 120 may verify the received result value on the basis of a value of the quotient polynomial rings corresponding to the random value and the received claim data. That is, the processor 120 may determine that the result value of the operation received from the external device 200 is true when the value of the quotient polynomial rings corresponding to the random value is the same as the received result value.

Alternatively, the processor 120 may transmit coefficient information of the quotient polynomial rings to the external device 200 and receive claim data, which is obtained by performing the operation process in the reverse order on the basis of the coefficient information, through the communication interface 110.

Alternatively, the processor 120 may receive operation-related information and operation data for each of at least one layer through the communication interface 110. In addition, the processor 120 may verify the operation data of each of the at least one layer on the basis of the received operation-related information. That is, the processor 120 may sequentially receive and verify operation-related information and operation data in the order from a last layer to an initial layer among the at least one layer. When it is determined that the operation-related information and operation data related to an $n^{th}$ layer are true, the processor 120 may commit the operation-related information and operation data related to the $n^{th}$ layer with the external device 200. In addition, the processor 120 may receive operation-related information and operation data related to an $(n-1)^{th}$ layer through the communication interface 110, and verify them. In an embodiment, the operation-related information may include arithmetic expression information, coefficient information, and the like. When the operation-related information is the information about the arithmetic expression, the processor 120 may verify the operation data on the basis of the relationship between the information about the arithmetic expression on which the modular arithmetic is performed and the operation data received from the external device 200.

Figure 3:
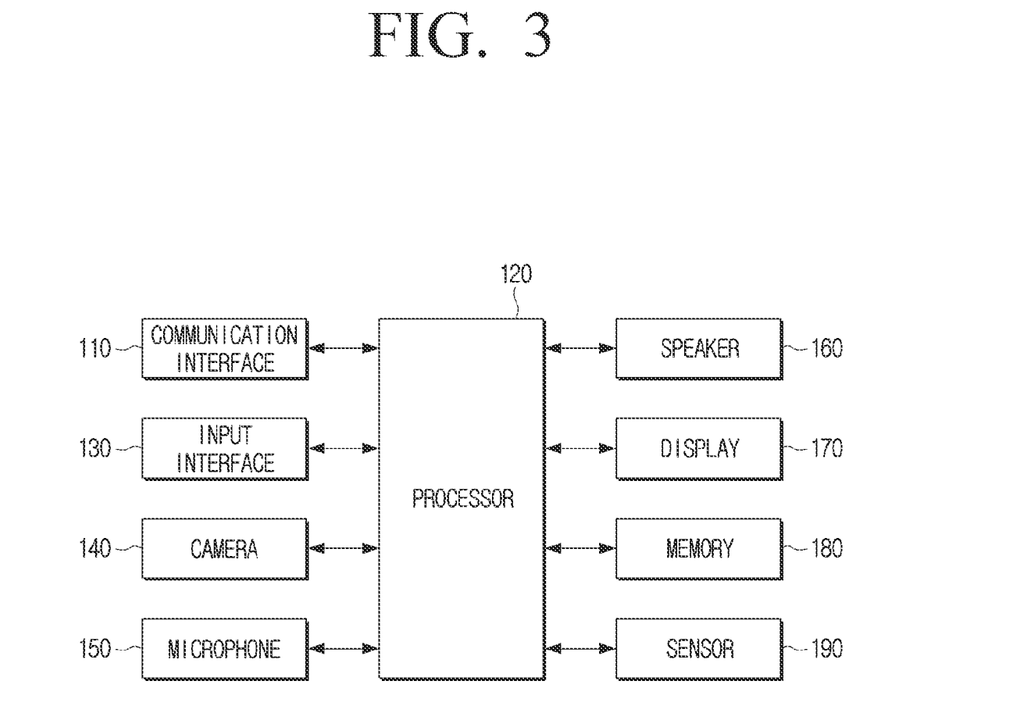
FIG. 3 is a detailed block diagram illustrating a configuration of an electronic apparatus according to an embodiment of the disclosure.

FIG. 3 is a detailed block diagram illustrating a configuration of an electronic apparatus according to an embodiment of the disclosure.

Referring to FIG. 3, the electronic apparatus 100 may include a communication interface 110, a processor 120, an input interface 130, a camera 140, a microphone 150, a speaker 160, a display 170, a memory 180, and a sensor 190. The communication interface 110 may be as described above with reference to FIG. 2.

A control command may be received from a user through the input interface 130. For example, a control command related to each component of the electronic apparatus 100 or the like may be received through the input interface 130. For example, the input interface 130 may include a keyboard, a button, a keypad, a touch pad, or a touch screen. The input interface 130 may be referred to as an input device, an inputter, an input module, or the like.

The camera 140 may capture an image of a surrounding environment. The processor 120 may perform a control operation according to a user's command or a preset algorithm on the basis of the captured image. For example, the camera 140 may include an RGB camera, a depth camera, a wide-angle camera, a telephoto camera, or the like.

Sound of a surrounding environment or a user's voice may be input through the microphone 150. The processor 120 may perform a control operation according to a command from a user or the preset algorithm on the basis of the input sound or voice. For example, the microphone 150 may include a general microphone, a surround microphone, a directional microphone, or the like.

The speaker 160 may output a sound signal. For example, the speaker 160 may output a verification result of a result value of an operation in the form of sound. In addition, the speaker 160 may output information about a command input by a user, warning-related information, operation-related information, notification information, or the like in the form of voice or notification sound.

The display 170 may output data processed by the processor 120 in the form of image. The display 170 may output a verification result of a result value of the operation in the form of image. For example, the display 170 may be embodied as a liquid crystal display (LCD), an organic light-emitting diode (OLED), a flexible display, a touch screen, or the like. When the display 170 is embodied as a touch screen, the electronic apparatus 100 may receive a control command through the touch screen.

The memory 180 may store data, an algorithm, and the like for performing functions of the electronic apparatus 100, and store a program, commands, and the like to be executed by the electronic apparatus 100. In addition, the memory 180 may store a result value of an operation, information related to the operation, data about the operation, and the like that are received from the external device 200. The algorithm or data stored in the memory 180 may be loaded into the processor 120 to perform a process of verifying the result value of the operation under the control of the processor 120. For example, the memory 180 may be implemented as a type of memory such as a read-only memory (ROM), a random access memory (RAM), a hard disc drive (HDD), a solid-state driver (SSD), or a memory card.

The sensor 190 may sense a surrounding environment of the electronic apparatus 100. Examples of the sensor 190 may include an angle sensor, an acceleration sensor, a gravity sensor, a gyro sensor, a geomagnetic sensor, a direction sensor, an infrared sensor, an ultrasonic sensor, a time-of-flight (ToF) sensor, a light wave detection and ranging (LiDAR) sensor, a laser sensor, a motion recognition sensor, a heat sensor, an image sensor, a tracking sensor, a proximity sensor, an illuminance sensor, a voltmeter, a current meter, a barometer, a hygrometer, a thermometer, a touch sensor, and the like.

The electronic apparatus 100 may include all or some of the components described above. The configuration of the electronic apparatus 100 has been described above. A process of verifying a result value of an operation will be described below.

Figure 4:
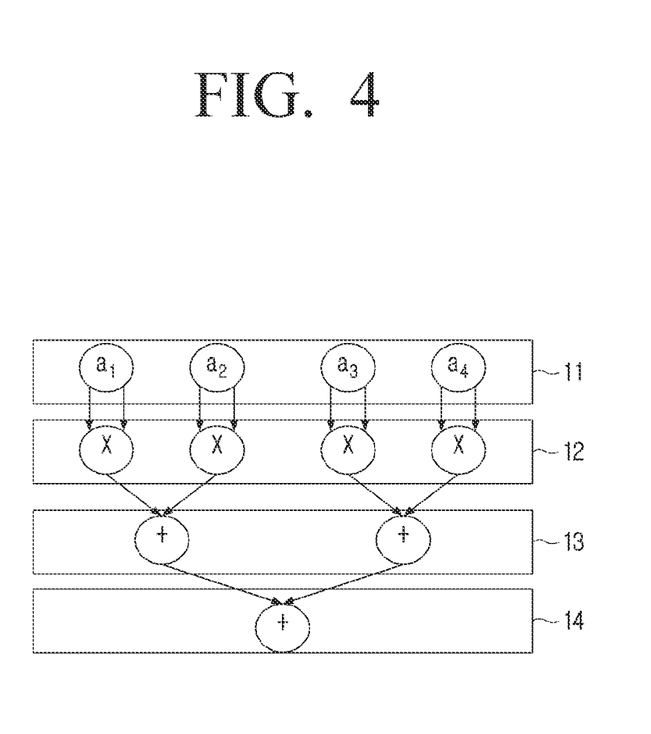
FIG. 4 is a diagram illustrating a Goldwasser, Kalai, Rothblum's (GKR) protocol according to an embodiment of the disclosure.

FIG. 4 is a diagram illustrating a GKR protocol according to an embodiment of the disclosure.

A method of verifying a result value of an operation using the GKR protocol will be described with reference to FIG. 4 below.

According to the disclosure, an identical equation of a polynomial may be checked efficiently by evaluating each polynomial at a random point. Specifically, in the disclosure, when C is an arithmetic circuit for a polynomial rings $\mathbb{Z}_p[t]$ where p is a prime number, whether a claim output g(t) is a correct output of the arithmetic circuit C with respect to an input $f_i(t)$ may be checked. For example, the arithmetic circuit C may include fan-in-2 gates in which a maximum input for performing a subtraction or multiplication operation is 2. That is, the electronic apparatus 100 may verify whether $C(f_1(t), f_2(t), \ldots, f_n(t))=g(t)$.

The electronic apparatus 100 may randomly sample $r_0$ in $\mathbb{Z}_p$ and verify an equation below. Here, $\overline{C}$ may denote an equivalent arithmetic circuit for $\mathbb{Z}_p$ generated by replacing addition and multiplication gates of C for $\mathbb{Z}_p[t]$.

$$\overline{C}(f_1(r_0), f_2(r_0), \ldots, f_n(r_0)) = g(r_0) \quad (1)$$

A verification calculation target relates to $\mathbb{Z}_p$ other than $\mathbb{Z}_p[t]$ and thus costs of verification may decrease significantly (about $1/(\deg\varphi(t))$).

The disclosure may be extended to a method of checking the calculation of a quotient polynomial ring $\mathbb{Z}_p[t]/(\varphi(t))$ involving a modular reduction operation by $\varphi(t)$ may be expanded. That is, the calculation of $\mathbb{Z}_Q[t]/(\varphi(t))$ may be expressed as the calculation of $\mathbb{Z}_p[t]$ involving the modular reduction operation by $\varphi(t)$. According to the disclosure, an equation below for $q(t) \in \mathbb{Z}_p[t]$ may be verified.

$$C(f_1(t), f_2(t), \ldots, f_n(t)) = g(t) + q(t)\varphi(t) \quad (2)$$

That is, the external device 200 may provide the electronic apparatus 100 with $g(t)+q(t)\varphi(t)$, and the electronic apparatus 100 may calculate a result value g(t) by performing modular reduction. Alternatively, the electronic apparatus 100 may commit a polynomial expression of $g(t)+q(t)\varphi(t)$ (or a coefficient) by a commitment scheme to reduce costs. Thereafter, the electronic apparatus 100 may obtain evaluation values, i.e., $g(r_0)+q(r_0)\varphi(r_0)$ and $g(r_0)$, for a random value of $r_0$, which are required for a verification process. A coefficient of g may be linearly calculated from $g(t)+q(t)\varphi(t)$ and thus the electronic apparatus 100 may obtain the evaluation value of $g(r_0)$ from the committed polynomial expression.

In addition, the disclosure may be extended to a method of verifying the calculation of $\mathbb{Z}_Q[t]/(\varphi(t))$ with the power Q of a prime number (excluding the prime number). For example, when Q is the power of 2, the calculation of $\mathbb{Z}_Q[t]$ may be included in $\mathbb{Z}_p[t]$. Here, p may be a prime number sufficiently greater than Q (e.g., p>2 Q). The external device 200 may perform modular reduction by Q after each multiplication. Because the calculation of $\mathbb{Z}_p[t]$ is given, the modular reduction by Q may be verified through modular reduction by q(t) by the commitment scheme. That is, the external device 200 may check values obtained before and after the modular reduction by Q and commit a bit representation of each polynomial coefficient by the commitment scheme of performing a verification process. As in the modular reduction by $\varphi(t)$, an efficient algorithm allowing the electronic apparatus 100 to obtain a value required for commitment (e.g., multilinear expansion) may be provided. Thus, according to the disclosure, the calculation of $\mathbb{Z}_Q[t]/(\varphi(t))$ may be verified similar to the verification of the calculation of $\mathbb{Z}_p[t]/(\varphi(t))$. According to the disclosure, a rounding operation $(a(t) \to [a(t)/2^k])$ indispensable for an HE system in which there are particularly a lot of bitwise operations for each coefficient may be verified.

According to an embodiment of the disclosure, a value of an operation performed on quotient polynomial rings may be verified using the GKR protocol. The GKR protocol may be an interactive proof protocol for verifying a value of an operation while data is transmitted between the electronic apparatus 100 (verifier V) and the external device 200 (prover P).

The external device 200 may provide the electronic apparatus 100 with a claim output y for an input $x \in X$ selected by the electronic apparatus 100. The electronic apparatus 100 and the external device 200 may exchange a series of messages with each other, and the electronic apparatus 100 may make an approval or rejection therefor. The interactive proof protocol may include features such as completeness and soundness. The completeness may be understood to mean that the external device 200 follows the interactive proof protocol for all inputs $x \in X$, and Pr[V accepts]=1 when y=f(x). The soundness may be understood to mean that $Pr[V \text{ accepts}] < \lambda_s$ when $y \neq f(x)$ for all inputs $x \in X$. Here, $\lambda_s$ may be referred to as a soundness probability.

First, according to the Schwartz-Zippel lemma, when $\mathbb{F}$ denotes a field and f: $\mathbb{F}^n \to \mathbb{F}$ denotes an n-variate nonzero polynomial D of total degree (the sum of degrees of variables), $$Pr_{\vec{x} \leftarrow A^m}[f(\vec{x}) = 0] \le \frac{D}{|A|}$$

in a random finite set $A \subseteq \mathbb{CF}$ where $D \le |A|$. According to the lemma of a sum-check check protocol, $$S(f) := \sum_{x_1 \in \{0,1\}} \sum_{x_2 \in \{0,1\}} \cdots \sum_{x_n \in \{0,1\}} f(x_1, x_2, \ldots, x_n),$$

when $\mathbb{F}$ denotes a finite field and f: $\mathbb{F}^n \to \mathbb{F}$ denotes an n-variate polynomial of degree at most $d < |\mathbb{F}|$ for each variable.

The external device 200 may calculate a result value by performing an operation requested by the electronic apparatus 100 using a circuit with a plurality of layers. In an embodiment, as shown in FIG. 4, the external device 200 may perform an operation on a1, a2, a3, and a4 at a first layer 11, perform a multiplication operation at a second layer 12, perform an addition operation at a third layer 13, and perform the addition operation at a fourth layer 14 to calculate a result value.

The sum-check protocol of a verification process may be performed n rounds and performed in a reverse order to the order of the process of calculating the result value of the operation. That is, the external device 200 may calculate operation data at the fourth layer 14, calculate operation data at the third layer 13 on the basis of the operation data calculated at the fourth layer 14, calculate operation data at the second layer 12 on the basis of the operation data calculated at the third layer 13, and calculate operation data at the first layer 11 on the basis of the operation data calculated at the second layer 12.

In the sum-check protocol, when a prover P (e.g., an external device) transmits a value S(f) and a polynomial $$f_1(t) := \sum_{(x_2, x_3, \ldots, x_n) \in \{0,1\}^{n-1}} f(t, x_2, x_3, \ldots, x_n).$$

to a verifier V (e.g., an electronic apparatus), the verifier V may check whether $f_1(0)+f_1(1)=S(f)$ and reject the value S(f). At an $i^{th}$ round ($2 \leq i \leq n$), when the verifier V may randomly select $r_{i-1}$ from $\mathbb{F}$ and transmit $r_{i-1}$ to the prover P, the prover P may transmit a polynomial of $$f_i(t) := \sum_{(x_{i+1}, \ldots, x_n) \in \{0,1\}^{n-i}} f(r_1, \ldots, r_{i-1}, t, x_{i+1} \ldots, x_n).$$

The verifier V may check whether $f_{i-1}(r_{i-1})=f_i(0)+f_i(1)$ instead of summing up and reject $f_{i-1}(r_{i-1})$. After a last $n^{th}$ round, the verifier V may approve the polynomial when $f_n(r_n)=f(r_1, r_2, \ldots, r_n)$ for a random element $r_n \in \mathbb{F}$ and reject $f_n(r_n)$.

That is, the verifier V may select a random point without summing up and check only an equation of $f_i(0)+f_i(1)=f_{i-1}(r_{i-1})$, and finally obtain a claim of $f(r_1, r_2, \ldots, r_n)=A$ with respect to a value of A. That is, a sum check (the verification of an operation process) allows the verifier V to simply check an equation of $(r_1, r_2, \ldots, r_n)=A$ instead of checking the summation of S(f).

$\tilde{V}(\vec{x})$: $\mathbb{F}^n \to \mathbb{F}$ is obtained from the extension of a unique multilinear (i.e., linearity of each variable, e.g., $f(x_1, x_2)=ax_1x_2+bx_1+cx_2$) polynomial V from a given function of V: $\{0, 1\}^n \to \mathbb{F}$. For example, for all $\vec{x} \in \{0, 1\}^n$, $\tilde{V}(\vec{x})=V(\vec{x})$. $\tilde{V}$ may be referred to as multilinear extension (MLE) of the polynomial V for the function $\mathbb{F}$.

The existence of the multilinear extension $\tilde{V}$ may be guaranteed by the following equation for multilinear extension:

$$\tilde{v}_{(x_1, x_2, \ldots, x_n)} := \sum_{\vec{b} \in \{0,1\}^n} v(\vec{b}) \cdot \prod_{i=1}^n [(1-b_i)(1-x_i)+b_i x_i] \quad (3)$$

Two MLEs may be identical to each other only when the same evaluation value is given for all $\vec{x} \in \{0, 1\}^n$.

As described above, the GKR protocol may be understood as an interactive proof protocol for an arithmetic circuit C: $\mathbb{F}^n \to \mathbb{F}$ for a finite field F. When a layer arithmetic circuit (for $\mathbb{F}$) where a depth is d, a size (i.e., the number of gates) is S, and a maximum input value is 2 is provided, each layer may include a gate that outputs a result of addition or multiplication of two inputs. An output layer may be 0, an input layer may be d, and an output of a gate of an $(i+1)^{th}$ layer may be used as an input of a gate of an $i^{th}$ layer. When $S_i$ denotes the size of the $i^{th}$ layer and is equal to the power of 2, i.e., $S_i=2^{s_i}$, for simplification, each gate of the $i^{th}$ layer may be numbered with a binary string of $\{0, 1\}^{s_i}$ (e.g., a leftmost gate corresponds to 0) and defined as a function of $V_i$: $\{0, 1\}^{s_i} \to \mathbb{F}$ associated with a given binary string of an output corresponding to the gate.

When $\tilde{V}_i$ denotes an MLE of Vi, the relationship between the MLE of Vi and an MLE defined by an adjacent layer may be expressed by (vector representation is omitted here):

$$\tilde{v}_i(z) = \sum_{(\omega_1, \omega_2) \in [0,1]^{2s_{i+1}}} \left[ \tilde{add}_i(z, \omega_1, \omega_2)(\tilde{V}_{i+1}(\omega_1) + \tilde{V}_{i+1}(\omega_2)) + \tilde{mult}_i(z, \omega_1, \omega_2)(\tilde{V}_{i+1}(\omega_1) + \tilde{V}_{i+1}(\omega_2)) \right]. \quad (4)$$

wherein $\tilde{add}_i$ (or $\tilde{mult}_i$) may denote an MLE of a function that is 1 only when an input binary string represents an addition (or multiplication) gate that provides an input and corresponding two gates and that is 0 otherwise.

A protocol for the verification of an operation may be executed in units of layers, starting at an output layer. A verifier provided with an output of a circuit may evaluate at a random point $\tilde{V}_0$ and obtain a claim of $\tilde{V}_0(z_0)=v_0$. Next, the verifier may reduce the claim to $\tilde{V}_1(z_{1,0})=v_{1,0}$ and $\tilde{V}_1(z_{1,1})=v_{1,1}$, and execute the sum-check protocol on the relationship between the MLEs described above together with a prover. The verifier may obtain $g1(t):=\tilde{V}_1((1-t)z_{1,0}+tz_{1,1})$ from the prover, reduce the claim again to $\tilde{V}_1(z_1)=v_1$ to check whether $g_1(0)=\tilde{V}_1(z_{1,0})$ and $g_1(1)=(z_{1,1})$, and evaluate $g_1(t^*):=\tilde{V}_1(z_1)=v_1$. By repeatedly performing this process in units of layers, the verifier may finally obtain a claim of $\tilde{V}_d(z_d)=v_d$ and verify whether $\tilde{V}_0$ defined as an input thereof is true. That is, the GKR protocol may be summarized as follows.

When C: $\mathbb{F}^n \to \mathbb{F}$ is an arithmetic circuit where the size (i.e., the number of gates) of a finite field $\mathbb{F}$ is S and a depth is d, the GKR protocol may be understood as an interactive proof protocol for the arithmetic circuit C where costs of a prover P and a verifier V and soundness probability $\lambda_s$ are defined by:

$$\begin{aligned} \mathcal{P}_{eval}, \mathcal{P}_{proof} &: O(\mathcal{S}), \\ \mathcal{V} &: O(n + d \log \mathcal{S}), \\ \lambda_s &: O\left(\frac{n + d \log S}{|\mathbb{F}|}\right), \end{aligned} \quad (5)$$

wherein $P_{eval}$ may denote costs of the prover P for evaluation of the circuit, and $P_{proof}$ may denote costs of the prover P for generation of a proof.

Meanwhile, the commitment scheme may be used when a witness w is not to be transmitted to the verifier V (e.g., an electronic apparatus) from the prover P (e.g., an external device) or is to be hidden. For example, the witness w may be private data or additional data such as parameters. The commitment scheme may be expressed as follows.

D may be a domain, and a function of f: $Dm \times Dn \to D$ may be taken into account. A functional commitment (FC) for f may be a tuple of four (probabilistic) polynomial time algorithms (e.g., setup, commit, open, and verify). It may be assumed that f is publicly known in all algorithms.

Setup($1^\lambda$)$\to$ck: when a security parameter $\lambda \in \mathbb{N}$ is given, a contract key ck may be output.

Commit(ck, $\vec{\mu}$)→$c_{\vec{\mu}}$, aux: when the contract key ck and a message $\vec{\mu} \in D^m$ are given, a commitment $c_{\vec{\mu}}$ and auxiliary information aux for $\vec{\mu}$ may be output.

Open(ck, $c_{\vec{\mu}}$, aux, $\upsilon$)→$op_y$: when the contract key ck, $c_{\vec{\mu}}$, the auxiliary information aux, and $\vec{v} \in D^n$ are given, an opening $op_y$ for $y=f(\vec{\mu}, \vec{v})$ may be output.

Verify(ck, c, $op_y$, $\vec{v}$, y): when the contract key ck, c, the opening $op_y$, $\vec{v}$, and $y \in D$ are given, 1 may be output when $c=c_{\vec{\mu}}$ and $op_y$ is an opening for $y=f(\vec{\mu}, \vec{v})$, and 0 may be output otherwise.

A commitment function for f may satisfy the following attributes (Pr[A|B] denotes a conditional probability of A when B is given):

(Correctness) For all $\vec{\mu} \in D^m$, a probability below may be 1.

$$Pr\left\{ \text{Verify}\left(ck, c_{\vec{\mu}}, ap_y, \vec{v}, y\right) = 1 \middle| \begin{array}{l} ck \leftarrow \text{Setup}(I^\lambda) \\ (c_{\vec{\mu}}, aux) \leftarrow \text{Commit}(ck, \vec{\mu}) \\ ap_y \leftarrow \text{Open}(ck, c_{\vec{\mu}}, aux, \vec{v}) \end{array} \right\} \quad (6)$$

(Binding) In the case of probabilistic polynomial time (PPT) opponent A, a probability below is ignorable. That is, $o(1/(\text{poly}(\lambda)))$.

$$Pr\left\{ \begin{array}{l} y \neq y' \\ \land \text{Verify}\left(ck, c, op, \vec{v}, y\right) = 1 \\ \land \text{Verify}\left(ck, c, op', \vec{v}, y'\right) = 1 \end{array} \middle| \begin{array}{l} ck \leftarrow \text{Setup}(1^\lambda) \\ (c, op, op', \vec{v}, y, y') \leftarrow A(ck) \end{array} \right\} \quad (7)$$

In the functional commitment scheme for an MLE, a prover may provide a commitment $c_w$ for the witness w to a verifier and start the GKR protocol in the circuit C. When an evaluation value of the MLE corresponding to the witness w is necessary to persuade the verifier in the GKR protocol, the prover may open a commitment to the verifier V, which will verify the witness w, with a verification algorithm. The cost of the verifier may be much lower than that for reading the witness w, and the prover cannot deceive the validator because of the binding attribute of the commitment.

When p is a prime number, the electronic apparatus 100 may first process a polynomial ring $\mathbb{Z}_p[t]$. Because $\mathbb{Z}_p$ is a finite field, the electronic apparatus 100 may reduce costs by verifying an equivalent arithmetic circuit Cp for the finite field instead of the arithmetic circuit C for $\mathbb{Z}_p[t]$.

Meanwhile, the electronic apparatus 100 may transmit a random value to the external device 200 and verify a result value on the basis of data calculated by the external device 200 on the basis of the random value.

For example, the electronic apparatus 100 may execute the GRK protocol for an arithmetic circuit Cp for $\mathbb{Z}_p$ generated by respectively replacing addition and multiplication gates of C for $\mathbb{Z}_p[t]$ with addition and multiplication gates for $\mathbb{Z}_p$, when $C: (\mathbb{Z}_p[t])^n \to \mathbb{Z}_p[t]$ denotes an arithmetic circuit for $\mathbb{Z}_p[t]$, and $X=(f_1(t), f_2(t), \ldots, f_n(t)) \in (\mathbb{Z}_p[t])^n$ denotes an output corresponding to an input, i.e., $Y=g(t) \in \mathbb{Z}_p[t]$, of the arithmetic circuit C, which is designated by the electronic apparatus 100 (verifier) and transmitted to the external device 200 (prover).

At the start of the protocol, the electronic apparatus 100 may perform sampling at a random point to in $\mathbb{Z}^p$, and convert an output Y into $y:=g_1(t_0) \in \mathbb{Z}_p$ when $Y=g(t)$ is taken into account at the point $t_0$. In addition, the electronic apparatus 100 may convert an input X into $x:=(f_1(t_0), f_2(t_0), \ldots, f_n(t_0)) \in (\mathbb{Z}_p)^n$ when each element is taken into account at the point $t_0$. The electronic apparatus 100 may inform the external device 200 of the point $t_0$, and verify the validity of $Cp(x)=y$, which is claimed by the external device 200 for the Cp. That is, the external device 200 may claim the circuit Cp for the input x. The electronic apparatus 100 may confirm that $C(X)=Y$ is $C(X)=Y$ only when it is determined the claimed $Cp(x)=y$ is true.

Because in most circuits, the number n of inputs is much less than the size (the number of gates) S of each circuit, verification costs may be reduced by approximately 1/(Nlog N) according to the disclosure.

In addition, the electronic apparatus 100 may reduce verification costs through commitment with the external device 200.

For example, Ψ may denote an arithmetic circuit for $\mathbb{Z}_p$ for obtaining each coefficient of a polynomial. When $F \in \mathbb{Z}_p[t]$ is a given polynomial and Ψ(F) is a coefficient of a polynomial with an output of Ψ, the external device 200 may evaluate and commit $t_0$, $a_0$, $b_0 \in \mathbb{Z}_p$ satisfying $a_0=F(t_0)$ and $b_0=\Psi(F)(t_0)$.

The external device 200 may commit a coefficient of F as a (functional) commitment for an MLE corresponding to the coefficient of F. The electronic apparatus 100 and the external device 200 may perform a verification process in the following order:

i) check whether $a_0$ is $F(t0)$ with an actually committed coefficient F;
ii) check whether $b_0$ is $G(t_0)$ for a polynomial G; and
iii) check whether $b_0$ is $\Psi(a_0)$.

The above process may be verified by the GKR protocol for $\mathbb{Z}_p$ and be based on the relationship between an MLE of the coefficient of F and the evaluation of F at a point $t_0$.

For example, when $F(x)=\Sigma_{i=0}^{N-1}\alpha_i x^i$, $$F_{(t_0)} = \sum_{\vec{p} \in \{0,1\}^{\log N}} a_{p_i}, t_o^{P_i} = \sum_{\vec{p} \in \{0,1\}^{\log N}} \tilde{V}_F \cdot (\vec{p}_i) \cdot \tau(\vec{p}_i), \quad (8)$$

wherein $\tilde{V}_F$ may denote an MLE corresponding to a coefficient $a_i$ of F, and τ may denote an MLF defined as $\tau(\vec{p}_i)=t_0^{p_i}$ for $\vec{p}_i \in \{0, 1\}^{\log N}$. $\vec{p}_i$ is a binary number, and a value obtained from the translation of $\vec{p}_i$, i.e., a leftmost entry of $\vec{p}_i$ may be a most significant bit.

The process i) may be performed as follows. The electronic apparatus 100 and the external device 200 may perform the sum-check protocol with respect to Equation 8 above. In addition, the electronic apparatus 100 may reduce the verification of $a_0=F(t_0)$ to the verification of $\tilde{V}_F(\vec{r}_0) \cdot \tau(\vec{r}_0)=A$. That is, the electronic apparatus 100 may evaluate $\tau(\vec{r}_0)$ on the basis of the commitment of the coefficient of F, and check $\tilde{V}_F(\vec{r}_0)$.

The process ii) is the same as the process i) except that the electronic apparatus 100 and the external device 200 perform the sum check for G instead of F. After the sum check, the electronic apparatus 100 may check whether $\tilde{V}_G(\vec{r}_1)=\tilde{V}_{\Psi(F)}(\vec{r}_1)$ (the process iii). The checking of whether $$\tilde{V}_{F_{i(t_0)}}(\vec{s}) = \sum_{\vec{p_i} \in \{0,1\}^{\log N}} \tilde{V}_{F_i}(\vec{s}, \vec{p_i}) \cdot \tau(\vec{p_i}), \vec{s} \in \mathbb{Z}_p^{\log M}$$

may contribute to skipping the verification of for performing a general GKR protocol by the circuit Ψ, and may be verified again by the electronic apparatus 100 for commitment of the column of F.

Lastly, in the process iii of processing a one-point reduction value instead of a polynomial, a polynomial G, which is an actual output of the circuit Ψ with respect to F, may be proved according to a one-point reduction strategy for a circuit for $\mathbb{Z}_p[t]$.

A one-point reduction method using a contract may be generalized to prove and verify a case in which many polynomials are parallel i.e., that $\{a_i, b_i, F_i(t_0), \Psi(F_i)(t_0)\}^M$ satisfies $a_i=F(t_i)$ and $b_i=\Psi(F)(t_i)$ for all $i \in \{1, \ldots, M\}$. In this case, the relationship between MLEs may be used as described below. Costs of the external device 200 increase M times but costs of the electronic apparatus 100 may increase only O(log M) times compared to a polynomial.

$$\tilde{V}_{F_{i(t_0)}}(\vec{s}) = \sum_{\vec{p_i} \in \{0,1\}^{\log N}} \tilde{V}_{F_i}(\vec{s}, \vec{p_i}) \cdot \tau(\vec{p_i}), \quad (9)$$

wherein $\vec{s} \in \mathbb{Z}_p^{\log M}$ and $\tilde{V}_{F_{i(t_0)}}(\vec{s})$ (a response to $\tilde{V}_{F_i}(\vec{s}, \vec{p_i})$) may denote MLEs defined to have $F_i(t_0)$(a response to $\tilde{V}_{F_i}(\vec{p_i})$) when $\vec{s} = \vec{i} \in \{0, 1\}^{\log M}$.

Quotient polynomial rings $\mathbb{Z}_Q[t]/\varphi(t)$ may be verified as follows. C may denote an arithmetic circuit for $\mathbb{Z}_Q[t]/\varphi(t)$, and N may denote a degree of the polynomial $\varphi(t)$. An input may be converted by an equivalent circuit for $\mathbb{Z}_p[t]$, as follows:

replace each input $\bar{f} \in \mathbb{Z}_p[t]/\varphi(t)$ with a corresponding representative $f \in \mathbb{Z}_p[t]$ with degree less than N;
replace each addition gate of $\bar{C}$ with an addition gate of $\mathbb{Z}_p[t]$ in C; and
replace each multiplication gate of $\bar{C}$ with a multiplication gate of $\mathbb{Z}_p[t]$, and perform a reduction through modular arithmetic by $\varphi(t)$ in C.

Here, through a modular arithmetic (mod-$\varphi(t)$) operation by $\varphi(t)$, $h \in \mathbb{Z}_p[t]$ with degree less than N, e.g., $H=h+q\varphi$, may be output for some $q \in \mathbb{Z}_p[t]$ when a polynomial of $H \in \mathbb{Z}_p[t]$ with degree less than (2 N−1) is input. A mod-q(t) operation may be represented by an arithmetic circuit for $\mathbb{Z}_p$, which outputs a coefficient of a polynomial when a coefficient of His input. The electronic apparatus 100 may verify C for $\mathbb{Z}_p[t]$ instead of $\bar{C}$ because C is the same as $\bar{C}$.

Because the mod-q(t) operation is performed to replace each multiplication gate with a multiplication gate for $\mathbb{Z}_p[t]$ and commit the multiplication gate, the costs of the electronic apparatus 100 may decrease.

The electronic apparatus 100 may verify a bitwise operation on $\mathbb{Z}_p[t]$ in a circuit for $\mathbb{Z}_p$. Many bitwise operation such as left and right shift (», «) and extraction $a \to \sum_{i=1}^{l} a_{j_i} \cdot 2^{j_i}$ may be represented by BitOp c by an appropriate value $c_j$. A bitwise operation BitOp($\bar{c}$ for performing the GKR protocol may be proved and verified by commitment. Actually, a committed number may be a binary number. Whether an input a matches the committed (binary) number and whether a claim output is a correct output may be determined in the same manner as the one-point reduction process. An output of the bitwise operation may be a coefficient of a polynomial.

When Q is the power of 2, an arithmetic circuit for $\mathbb{Z}_Q[t]$ or $\mathbb{Z}_Q[t]/(\varphi(t))$ may be verified as described below. The verification and commitment of calculation should be performed in a finite field. In the disclosure, a method for $\mathbb{Z}_Q$ may be generalized to a method for $\mathbb{Z}_Q[t]$ and $\mathbb{Z}_Q[t]/(\varphi(t))$ by using a verifiable bitwise operation for $\mathbb{Z}_p$.

$C_Q$ may denote an arithmetic circuit for $\mathbb{Z}_Q[t]$. Because Q is the power of 2, a modular reduction operation by Q may be represented by a bitwise operation for $\mathbb{Z}_p[t]$.

In the case of an arithmetic circuit for $\mathbb{Z}_Q[t]/(\varphi(t))$, an additional modular reduction operation by $\varphi$ may be performed. When a circuit $C_{Q,\varphi}$ for $\mathbb{Z}_Q[t]/(\varphi(t))$ is given, $C_\varphi$ may be understood as an equivalent circuit for $\mathbb{Z}_p[t]$ where the modular reduction operation by Q and the modular reduction operation by $\varphi$ are used.

To verify the mod-$\varphi$ operation and the mod-Q operation, the external device 200 may commit a coefficient of F and a binary representation of F mod $\varphi$. In addition, the external device 200 may check $C_\varphi$ by applying a process of verifying $\mathbb{Z}_p[t]$, as well as the commitment of the coefficient of F and a binary representation of F mod $\varphi$.

Figure 5:
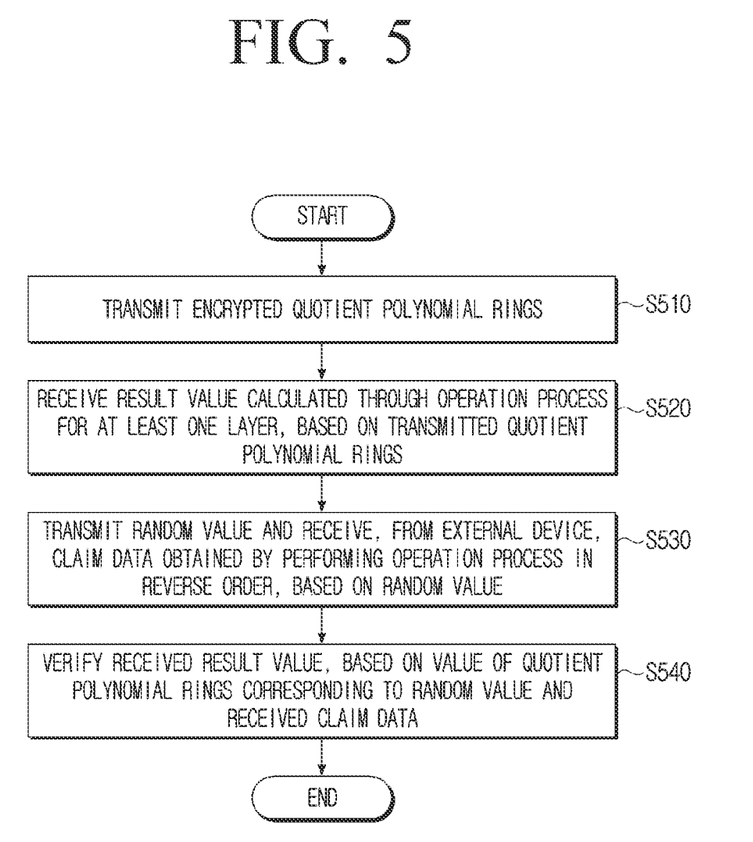
FIG. 5 is a flowchart of a verification method of an electronic apparatus according to an embodiment of the disclosure.

FIG. 5 is a flowchart of a verification method of an electronic apparatus according to an embodiment of the disclosure.

Referring to FIG. 5, the electronic apparatus may transmit encrypted quotient polynomial rings to an external device (S510). Each of the quotient polynomial rings may be a polynomial for performing a modular arithmetic on a general polynomial ring.

The electronic apparatus may receive, from the external device, a result value calculated through an operation process for at least one layer on the basis of transmitted quotient polynomial rings (S520). Next, the electronic apparatus may transmit a random value to the external device, and receive, from the external device, claim data obtained by performing the operation process in the reverse order on the basis of the random value (S530).

Alternatively, the electronic apparatus 100 may transmit coefficient information of the quotient polynomial rings to the external device, and receive claim data obtained by performing the operation process in the reverse order on the basis of the coefficient information.

The electronic apparatus may verify the received result value on the basis of a value of the quotient polynomial rings corresponding to the random value and the received claim data (S540). The electronic apparatus may receive operation-related information and operation data of each of at least one layer, and verify the operation data of each of the at least one layer on the basis of the received operation-related information. That is, the electronic apparatus may sequentially receive and verify operation-related information and operation data in the order from a last layer to an initial layer among the at least one layer. For example, the operation-related information may include arithmetic expression information, coefficient information, and the like. When the operation-related information is the arithmetic expression information, the electronic apparatus may perform the modular arithmetic on the arithmetic expression information and verify the operation data on the basis of the relationship between the arithmetic expression information on which the modular arithmetic is performed and the received operation data.

Figure 6A:
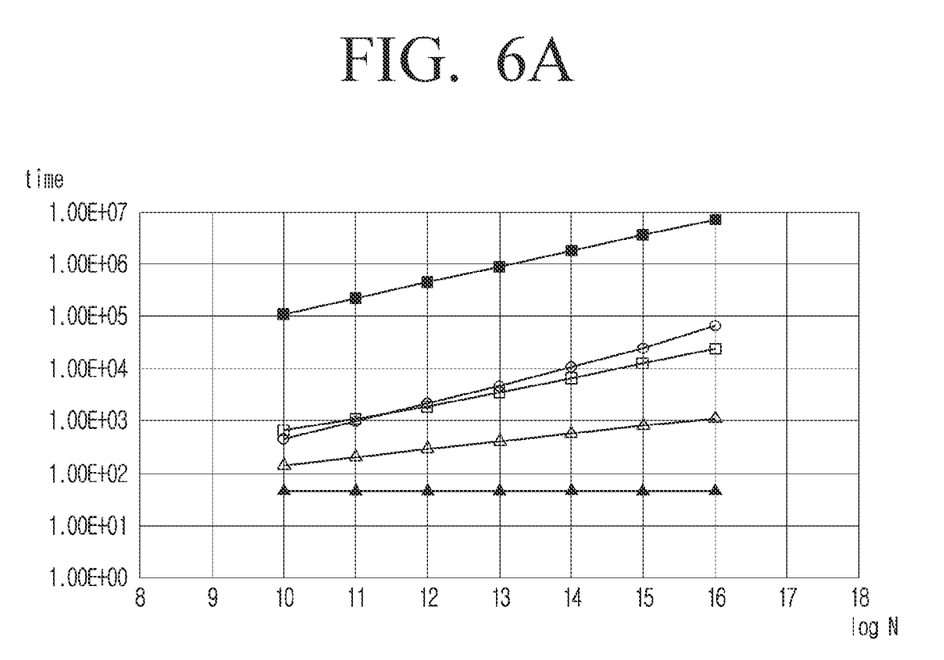
FIGS. 6A and 6B are diagrams illustrating the performance of a verification method of the disclosure.
Figure 6B:
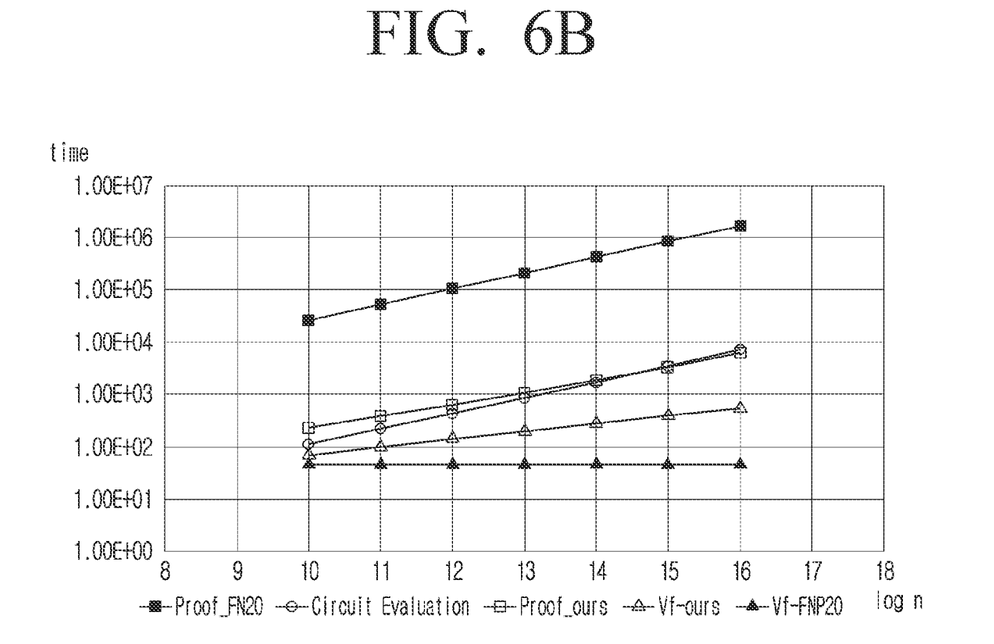

FIGS. 6A and 6B illustrate the performance of a verification method of the disclosure.

FIGS. 6A and 6B are diagrams comparing the performances of multiplication of n pairs of polynomials for $\mathbb{Z}_p[t]/(t^N+1)$. In FIGS. 6A and 6A, an X-axis and a Y-axis are logarithmic scales, and the Y-axis is indicated by exponents. p denotes a prime number (size: 128 bits), and Q denotes the power of 2 (size: 32 bits).

Referring to FIGS. 6A and 6B, a processing speed of a prover is about 100 times faster in verification calculation, because a mod-$\varphi(t)$ operation and the one-point reduction method are used in the disclosure.

The verification methods of an electronic apparatus according to the various embodiments described above may be provided through a computer program product. The computer program product may be a software (S/W) program or may include a non-transitory computer-readable medium storing the S/W program.

The non-transitory computer-readable medium should be understood as a medium that stores data semi-permanently and that is readable by a machine rather than a medium, e.g., a register, a cache or a memory, that stores data for a short time. Specifically, various applications or programs as described above may be provided by being stored in a non-transitory computer-readable recording medium such as a CD, a DVD, a hard disk, a Blu-ray disk, a USB, a memory card, a ROM, or the like.

While embodiments of the disclosure have been illustrated and described herein, the disclosure is not limited thereto and various modifications may be made therein by those of ordinary skill in the art without departing from the gist of the disclosure as claimed in the accompanying claims. These modifications should not be understood separately from the scope and spirit of the disclosure.

What is claimed is:

1. A verification method of an electronic apparatus, comprising:
transmitting encrypted quotient polynomial rings to an external device;
receiving, from the external device, a result value calculated through an operation process for at least one layer on the basis of the transmitted encrypted polynomial rings;
transmitting a random value to the external device, and receiving claim data obtained by performing the operation process in a reverse order on the basis of the random value from the external device; and
verifying the received result value on the basis of a value of the quotient polynomial rings corresponding to the random value and the received claim data.

2. The verification method as claimed in claim 1, further comprising transmitting coefficient information of the quotient polynomial rings to the external device, and
wherein the receiving of the claim data comprises receiving claim data obtained by performing the operation process in the reverse order on the basis of the coefficient information.

3. The verification method as claimed in claim 1, further comprising:
receiving operation-related information and operation data of each of the at least one layer; and
verifying the operation data of each of the at least one layer on the basis of the received operation-related information.

4. The verification method as claimed in claim 3, wherein the receiving of the operation-related information and the operation data and the verifying of the operation data comprise sequentially receiving the operation-related information and the operation data and verifying the operation data in the order from an initial layer to a last layer among the at least one layer.

5. The verification method as claimed in claim 4, wherein the operation-related information comprises at least one of arithmetic expression information or coefficient information.

6. The verification method as claimed in claim 5, wherein, when the operation-related information is the arithmetic expression information, the verifying of the operation data comprises performing a modular arithmetic on the arithmetic expression information, and verifying the operation data on the basis of a relationship between the arithmetic expression information on which the modular arithmetic is performed and the received operation data.

7. The verification method as claimed in claim 1, wherein each of the quotient polynomial rings comprises a polynomial for performing a modular arithmetic on a general polynomial ring.

8. An electronic apparatus comprising:
a communication interface; and
a processor,
wherein the processor is configured to:
control the communication interface to transmit encrypted quotient polynomial rings to an external device, receive from the external device a result value calculated by performing an operation process for at least one layer on the basis of the encrypted quotient polynomial rings, transmit a random value to the external device, and receive claim data obtained by performing the operation process in a reverse order on the basis of the random value from the external device; and
verify the received result value on the basis of a value of the quotient polynomial rings corresponding to the random value and the received claim data.

9. The electronic apparatus as claimed in claim 8, wherein the processor is further configured to control the communication interface to transmit coefficient information of the quotient polynomial rings to the external device and receive claim data obtained by performing the operation process in the reverse order on the basis of the coefficient information.

10. The electronic apparatus as claimed in claim 8, wherein the processor is further configured to control the communication interface to receive operation-related information and operation data for each of the at least one layer, and verify the operation data of each of the at least one layer on the basis of the received operation-related information.

11. The electronic apparatus as claimed in claim 10, wherein the processor is further configured to sequentially receive and verify the operation-related information and the operation data in the order from a last layer to an initial layer among the at least one layer.

12. The electronic apparatus as claimed in claim 11, wherein the operation-related information comprises at least one of arithmetic expression information or coefficient information.

13. The electronic apparatus as claimed in claim 12, wherein, when the operation-related information is the arithmetic expression information, the processor is further configured to perform a modular arithmetic on the arithmetic expression information and verify the operation data on the basis of a relationship between the arithmetic expression information on which the modular arithmetic is performed and the received operation data.

14. The electronic apparatus as claimed in claim 8, wherein each of the quotient polynomial rings comprises a polynomial for performing a modular arithmetic on a general polynomial ring.

15. A non-transitory computer-readable storage medium storing a program for performing a verification method of an electronic apparatus, wherein the verification method comprises:
  transmitting encrypted quotient polynomial rings to an external device;
  receiving, from the external device, a result value calculated through an operation process for at least one layer on the basis of the transmitted encrypted quotient polynomial rings;
  transmitting a random value to the external device and receiving claim data obtained by performing the operation process in a reverse order on the basis of the random value from the external device; and
  verifying the received result value on the basis of a value of the quotient polynomial rings corresponding to the random value and the received claim data.

* * * * *